United States Patent [19]

Shikano

[11] Patent Number: 4,570,232
[45] Date of Patent: Feb. 11, 1986

[54] SPEECH RECOGNITION APPARATUS

[75] Inventor: Kiyohiro Shikano, Tokorozawa, Japan

[73] Assignee: Nippon Telegraph & Telephone Public Corporation, Tokyo, Japan

[21] Appl. No.: 448,085

[22] Filed: Dec. 9, 1982

[30] Foreign Application Priority Data

Dec. 21, 1981 [JP] Japan ................................. 56-206351
Jan. 11, 1982 [JP] Japan ..................................... 57-2564
Jan. 11, 1982 [JP] Japan ..................................... 57-2565

[51] Int. Cl.$^4$ .............................................. G10L 1/00
[52] U.S. Cl. ................................... 364/513.5; 381/43
[58] Field of Search ................................... 381/41–43; 364/513.5

[56] References Cited

U.S. PATENT DOCUMENTS 3,816,722 6/1974 Sakoe et al. ............................. 381/42
4,286,115 8/1981 Sakoe ..................................... 381/43
4,488,243 6/1981 Brown et al. .......................... 381/43

Primary Examiner—E. S. Matt Kemeny
Attorney, Agent, or Firm—Pollock, Vande Sande and Priddy

[57] ABSTRACT

In a speech recognition system using time-warping for better matching, accuracy and efficiency of dynamic programming computation is improved by expanding the approximated start and end points into an assembly of points, and performing successive iteration for lattice points $d_{i,j}$ spaced $N \geq 3$ points apart rather than every lattice point.

26 Claims, 23 Drawing Figures

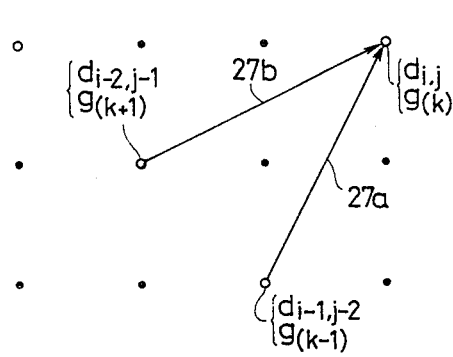
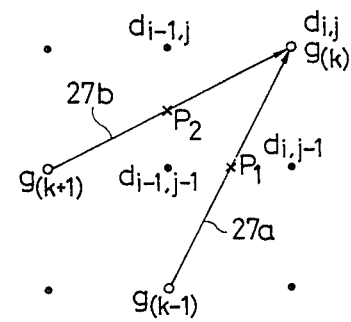
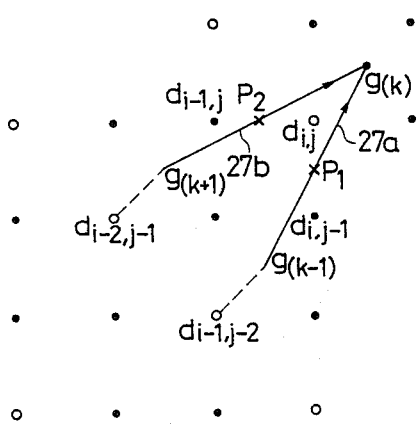
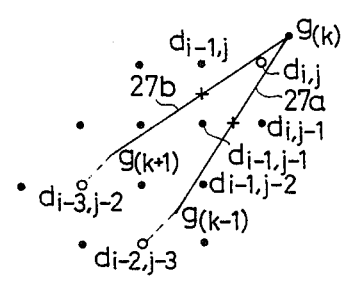
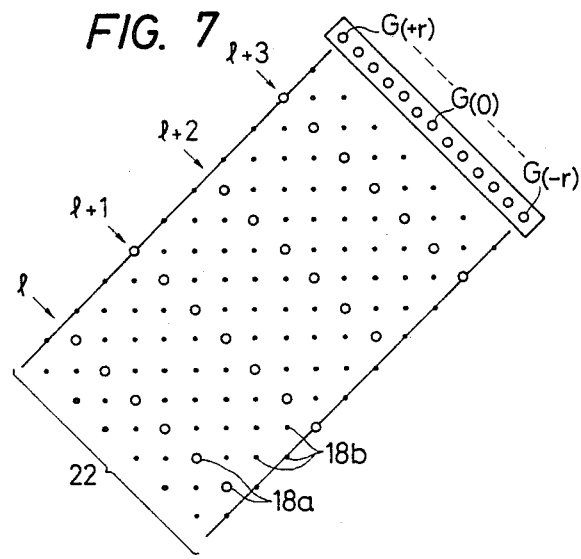

SPEECH RECOGNITION APPARATUS

BACKGROUND OF THE INVENTION

The present invention relates to a sequence patterns matching apparatus which is employed, for instance, in the field of speech recognition, for obtaining the similarity measure between two sequence patterns of feature parameters in terms of the distance or similarity therebetween by means of nonlinear normalization matching using dynamic programming.

The sequence that can be handled by the sequence patterns matching system of the present invention is a sequence of feature quantities. If the distance or similarity between the feature quantities is defined, a sequence of any pattern, such as a voice pattern or hand-written letter pattern, can be dealt with. In the following the sequence patterns matching system will be described as being applied to a time sequence of feature quantities of a voice pattern.

The voice is information transmitting means which is the easiest for the man to use and the most familiar to him. Accordingly, speech recognition equipment is of wide application, such as data input by the voice, a dialogue with a machine, dialling by the voice and so forth.

The speed of utterance often varies even for the same word spoken by the same person. In view of this, matching utilizing dynamic programming in the speech recognition (hereinafter referred to as DP matching) is employed in the calculation of the distance between a time sequence of an input speech, $A = a_1, a_2, \ldots a_n$, and a time sequence of a reference pattern, $B = b_1, b_2, \ldots b_m$, by making their elements correspond to each other while permitting expansion and contraction of the time axis between the sequences as shown, for example, in U.S. Pat. No. 3,816,722 issued to Sakoe et al on June 11, 1974 (see, in particular, FIGS. 1 and 2). In the conventional DP matching of this kind, a successive iteration computation is carried out at all lattice points (i, j) within an adjustment window on a distance matrix $D = (d_{i,j})$ of the elements of the sequences A and B, where $d_{i,j}$ is the distance between an i-th element $a_j$ of the sequence A and a j-th element $b_j$ of the sequence B as set forth in the abovesaid U.S. patent. Further, a slope constraint is provided for preventing the correspondence of one element to more than two elements. Therefore, the DP matching, though employing the dynamic programming, possesses the defect of involving a large amount of computation. Moreover, the provision of the slope constraint introduces the drawback of requiring a number of buffer memories for storing a successively calculated value $g(i, j)$.

Besides, in the prior art, DP matching is executed only on a distance matrix which can be calculated from elements $a_i$ and $b_j$ ($1 \leq i \leq n$, $1 \leq j \leq m$) after elements $a_1$ and $b_1$ at the start point of a speech extraction period. In practice, however, it is difficult to accurately extract the speech period from the start point to the end point thereof at all times and, in the prior art, the DP matching between time sequences of speech is accompanied by ambiguity in the speech period extraction. In consequence, misrecognition is caused by an error in the extraction of speech period. To avoid this, the inventor of this application proposed in Proceedings 1-1-10 of the Autumn Meeting by Acoustical Society of Japan, October 1980 to use a special path in a vertical or lateral direction alone in the vicinity of the start point of the speech extraction period (which method will hereinafter be referred to as the quasi-edge free method). Since the quasi-edge free method employs a special DP path, there are cases when an abnormal correspondence occurs to adversely affect the recognition performance.

SUMMARY OF THE INVENTION

It is therefore an object of the present invention to provide a sequence patterns matching apparatus which is small in computational quantity and does not call for large-capacity buffer memories for storing successively calculated values.

Another object of the present invention is to provide a sequence patterns matching apparatus which is capable of obtaining the similarity measure with high accuracy without being affected by the segmentation ambiguity of the extracted sequence of feature parameters.

According to the present invention, the successive iteration computation of the dynamic programming is not performed for all lattice points on a matrix $D = (d_{i,j})$ (where $d_{i,j}$ is the distance or similarity between elements $a_i$ and $b_j$) between elements of two segments $A = a_1, a_2, \ldots a_n$ and $B = b_1, b_2, \ldots b_m$ but the successive iteration computation is carried out at the calculation points corresponding to lattice points spaced N ($N \leq 3$) points apart. That is to say, the successive iteration computation of the dynamic programming is executed at all lattice points which satisfy $i + j = M + N$ (where M is a constant); the successive iteration computation of the dynamic programming is executed at all lattice points which satisfy $i + j = M + 2N$; and thereafter the successive iteration computation of the dynamic programming is similarly executed for $i + j = M + 3N$, $i + j = M + 4N$, … . Thus, according to the present invention, the number of repetitions of the successive iteration computation is reduced to 1/N of that involved in the prior art system and, furthermore, the computational quantity for the slope constraint can be decreased and the number of buffer memories for storing the successively calculated values, i.e. cost function values $g(i, j)$ is only twice the width of the adjustment window. Consequently, the computational quantity can be appreciably reduced as compared with that needed in conventional DP matching. Moreover, use is also made of sequence information $a_n$, to $a_0$ and $b_m$, to $b_0$ ($n' \leq 0$, $m' \leq 0$) preceding elements $a_1$ and $b_1$, at which the speech extraction period is regarded to start, and the cost function value of the DP matching is obtained utilizing the distances between these elements, too, and the start point is determined subsequently so that the cost function value may become minimum. Also at the end point, use is made of sequence information $a_{n+1}$ to $a_{n''}$ and $b_{m+1}$ to $b_{m''}$ ($n'' > n$, $m'' > m$) following elements $a_n$ and $b_m$, at which the speech extraction period is regarded to end, and the position of the end point is determined subsequently so that the cost function of the DP matching may become minimum on the distance matrix $D = (d_{i,j})$ ($n' \leq i \leq n''$, $m' \leq j \leq m''$). In the actual DP matching, however, the cost function is necessary but the information on the speech extraction point is not always needed and, accordingly, the start point is not obtained explicitly. In this way, the present invention permits the execution of the DP matching between time sequences which is accompanied by the ambiguity of the speech extraction, and hence enables a substantial reduction of the misrecognition which is caused by an error in extracting speech in the prior art.

BRIEF DESCRIPTION OF THE DRAWINGS

FIGS. 6A to 6D are diagrams showing examples of the DP paths in the first embodiment of the present invention;

FIG. 7 is a diagram showing the relationship between buffer memories for storing successive iteration computation values of the DP matching and computation lattice points in the present invention;

DESCRIPTION OF THE PREFERRED EMBODIMENTS

General Arrangement of Speech Recognition Apparatus

Figure 1:
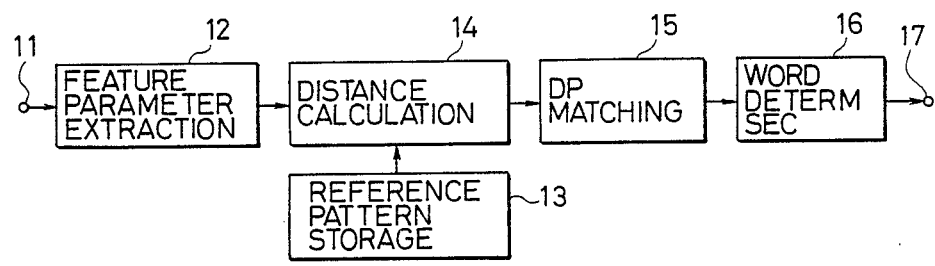
FIG. 1 is a block diagram showing an example of the arrangement of the speech recognition system according to the DP matching.

FIG. 1 illustrates, by way of example, the arrangement of a speech recognition system to which the present invention is applicable. An input speech signal from an input terminal 11 is applied to a feature parameter extracting section 12, wherein it is converted into a time sequence of feature parameters, $A = a_1, a_2, \ldots a_n$. The time sequence A of feature parameters of the input speech signal is provided to a distance calculating section 14, wherein a distance matrix $D = (d_{i,j})$ between the time sequence A and a time sequence $B = b_1, b_2, \ldots b_n$ of feature parameters of a reference pattern prestored in a reference pattern storage section 13 is calculated. The distance matrix thus calculated is subjected in a DP matching section 15 to a matching process utilizing dynamic programming to obtain distances (scores) between the feature parameters of the time sequence A of the input speech and the time sequence B of the reference pattern. A word (the sequence of the reference pattern) of the smallest one of the scores is determined by a word determining section 16 and the name of the word is output at a terminal 17 as the result of recognition of the input speech from a terminal 17.

Conventional DP Matching

Figure 2:
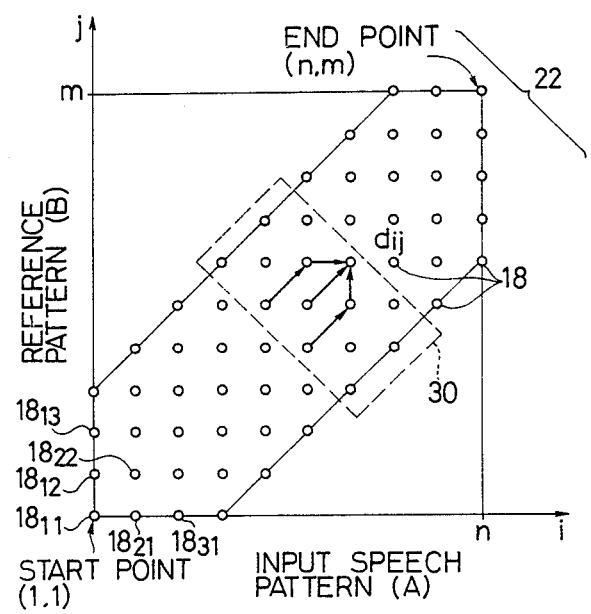
FIG. 2 is a diagram showing, by way of example, the DP matching and a distance matrix heretofore employed.

The matching process performed in the DP matching section 15 has been carried out in the following manner as described in the aforementioned U.S. Pat. No. 3,816,722. As illustrated in FIG. 2, the distance matrix $D = (d_{i,j})$ is expressed by arranging the numbers of the elements i of the sequence A of the input speech pattern in the row direction and the numbers of the elements j of the sequence B of the reference pattern in the column direction. A successive iteration computation of the dynamic programming is conducted for each of lattice points $18_{12}$ and $18_{21}$ which satisfy $i+j = 2+1$; the successive iteration computation of the dynamic programming is carried out for each of lattice points $18_{13}$, $18_{22}$ and $18_{31}$ which satisfy $i+j = 2+2$; and thereafter the successive iteration computation of the dynamic programming is similarly conducted for each of lattice points which satisfy $i+j = 2+3$, $i+j = 2+4$, $\ldots$ In this way, the score (the distance) is obtained by the operation of the following recurrence formula for each lattice point 18 from the vicinity of the start point (1, 1) to the end point (n, m).

$$g(i, j) = \min \begin{cases} g(i-1, j-2) + 2d_{i,j-1} + d_{i,j} \\ g(i-1, j-1) + 2d_{i,j} \\ g(i-2, j-1) + 2d_{i-1,j} + d_{i,j} \end{cases} \quad (1)$$

Furthermore, an adjustment window constraint 22 is provided to restrict the lattice points for the computation within a certain range on either side of the line joining the start point (1, 1) and the end point (n, m).

In this way, the dynamic programming is to trace from the start point (1, 1) to the end point (n, m) via each lattice point (i, j) on the distance matrix $D = (d_{i,j})$ so that the sum of the values $d_{i,j}$ of the distances on the traced lattice points may be minimum, and the sum of the distances $d_{i,j}$ is used as a score S(A:B), which is given by the following expression:

$$S(A:B) = \frac{1}{|n+m|} \min_{\{(i,j)\}} \left( d_{1,1} + \sum_{\{(i,j)\}} d_{i,j} \right) \quad (2)$$

where $\{(i, j)\}$ represents the sequence of the lattice points $(1, 1)$ $(i_2, j_2) \ldots (n, m)$ and $$|i_{k+1} - i_k| + |j_{k+1} - j_k| = 1 (i_{k+1} \geq i_k, j_{k+1} \geq j_k) \quad (3)$$

and the path which provides the minimum value is called an optimum path.

Ideally, the smallest value of a line integral from a point (0, 0) to a point (n, m) should be obtained on a distance function d (x, y) of a continuous system but, as its approximate solution, Expression (2) is used. In the continuous system, it is formulated as follows:

$$S = \min \left\{ \int_c d(x,y) ds / \int_c ds \right\} \quad (4)$$

where c is a monotonously increasing line integration path from the point (0, 0) to the point (n, m).

In the case of formulating the approximate solution as shown by Expression (2) and calculating the value of the score S(A:B) through using the dynamic programming, the following limitations are imposed on the path in the conventional method.

Discrepancy in the Path Length

As a sequence of paths $(1, 1)$, $(i_1, j_2)$, ... $(n, m)$ in the prior art DP matching is selected a sequence of lattice points which differ by one in terms of a city block distance as indicated in Expression (3), or a sequence of lattice points which satisfy the following:

$$\max\{|i_{k+1}-i_k|, |j_{k+1}-j_k|\} = 1 (i_{k+1} \geq i_k, j_{k+1} \geq j_k) \quad (5)$$

Figure 3:
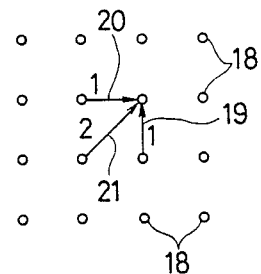
FIG. 3 is a diagram showing vertical, lateral and oblique paths in the conventional DP matching.

Accordingly, the paths which are followed on the distance matrix are vertical, lateral and oblique paths 19, 20 and 21 as shown in FIG. 3. Since the definition of the city block distance is used as the definition of the path length, the vertical and lateral paths 19 and 20 have a length of 1 and the oblique path 21 has a length of 2. Ideally, the path length should be considered in such a continuous system as indicated by Expression (4) and, in such a case, the distance between the lattice point is the Euclidean distance and the oblique path 21 has a length of $\sqrt{1^2+1^2} = \sqrt{2}$; therefore, Expressions (2) and (4) greatly differ.

Slope Constraint

Figure 4:
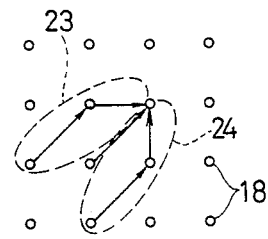
FIG. 4 is a diagram showing a typical slope constraint path in the conventional DP matching.

In order to prevent matching along an extremely unbalanced path, succession of only lateral or vertical paths is not allowed but the lateral or vertical path is combined with an oblique one; namely, slope-constrained paths 23 and 24 are used as shown in FIGS. 2 and 4. The slope-constrained path greatly contributes to improvement in the recognition performance but incurs an increase in the computational quantity.

First Embodiment

Figure 5A:
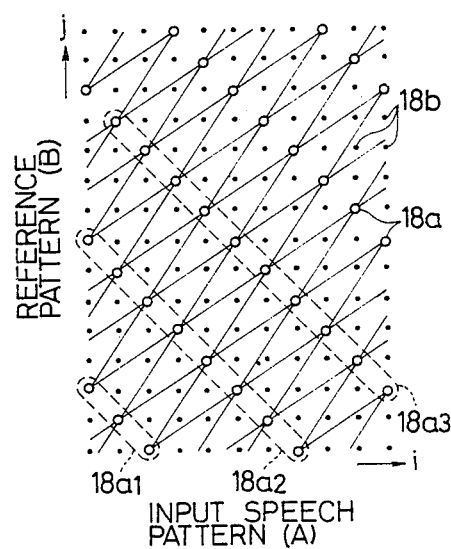
FIG. 5A is a diagram showing lattice points spaced N points apart and DP paths on a distance matrix in a first embodiment of the present invention.

FIG. 5A shows, on the distance matrix D, an example of computation points in the matching apparatus of the present invention. In FIG. 5A, white circles 18a indicate lattice points where a computation takes place and black circles 18b are lattice points where no computation takes place. As will be seen from FIG. 5A, the successive iteration computation of the dynamic programming is conducted not at each lattice point but at a lattice point spaced N ($N \geq 3$; in this example, $N=5$) points apart from each computation stage. That is to say, a first stage computation is carried out for each lattice point $18a_1$ where $i+j=2+N$; a second stage computation is carried out for each lattice point $18a_2$ where $i+j=2+2N$; a third stage computation is carried out for each lattice point $18a_3$ where $i+j=2+3N$; and thereafter, the computations are carried out for lattice points spaced N points apart in a similar manner. The DP paths joining the lattice points thus spaced each form one side of the same rhombus and the lengths of the DP paths are all equal in terms of the Euclidean distance and, in addition, the slope constraint is naturally provided. Moreover, the angle in the direction from the start point of the rhombus to the end point thereof is smaller than in the case depicted in FIG. 3.

As described above, according to the present invention, the successive iteration computation of the DP matching is performed only on the lattice points spaced N points apart and, in consequence, the number of repetitions of the successive iteration computation for calculating the scores in the case of following an optimum path is 1/N of that required in the prior art method which performs the successive iteration computation at each lattice point; namely, the computational quantity can be reduced appreciably. Furthermore, the lengths of the DP paths are all equal in terms of Euclidean distance and, consequently, there is no discrepancy in the length of the DP path. In addition, since each path itself is oblique, the slope constraint of the vertical and lateral paths can be naturally introduced. The DP paths do not sharply bend and the computation of the integral value of the distance along the paths is to compute a quantity close to the integral value obtained with Expression (4) in the continuous system; that is, the above-said integral value approaches an ideal value.

Next, a description will be given of a buffer memory G(k) for storing the successively computed value at the point (i, j), that is, the cost function value, g(i, j). In this case, $k=j-i$. The computation stage for the successive iteration computation of the DP matching is selected to be each lattice point (i, j) which satisfies $i+j=2+Nl$ as shown in FIG. 7, and the successive iteration computation of the DP matching is performed for the lattice points in the order $l=1, 2, \ldots$ For instance, since the preceding calculated value g necessary for the computation at each lattice point of an (l+2)-th stage is only the calculated value in an (l+1)-th stage, it is sufficient to prepare buffer memories G(−r) to G(r) twice as many as the number r of the lattice points in each stage; namely, the successive iteration computation can be carried out with a smaller number of buffer memories than in the past. In the prior art, as will be seen from the paths 23 and 24 shown in FIG. 4, the successive iteration computation in each stage calls for the computed value g obtained three stages before, too; that is, it is necessary to store all computed values g within a range indicated by 30 in FIG. 2 and a larger number of buffer memories are needed.

Specific Examples of Computational Expressions

Next, a description will be given of examples of the successive iteration computation at each computation point in the case of employing the present invention. [In the case of $N=3$]

Example 1

FIG. 6A shows DP paths of the DP matching in the case of a computation at the lattice point (i, j). The DP paths are a path 27a between lattice points $(i−1, j−2)$ and $(i, j)$ and a path 27b between lattice points $(i−2, j−1)$ and $(i, j)$, and the distance between the sequences A and B on each path is represented by $d_{i,j}$.

$$g(k) \leftarrow \min \begin{pmatrix} g(k-1) + d_{i,j} \\ g(k+1) + d_{i,j} \end{pmatrix} \quad (6)$$

$$\text{where } k = j - i.$$

The upper and lower terms on the right side of Expression (6) are for the paths 27a and 27b, respectively. $g(k−1)$ and $g(k+1)$ are calculated in accordance with the contents of the buffer memories $G(k−1)$ and $G(k+1)$ and the smallest one of them is used as $g(k)$.

Example 2

The distances between the sequences A and B on the DP paths 27a and 27b are obtained by interpolating the elements of lattice points near these paths. That is, as shown in FIG. 6, the distance between the sequences A and B at the intersection of the line joining lattice points (j−1, j−1) and i, j−1) with the path 27a can be calculated from distances $d_{i-1,j-1}$ and $d_{i,j-1}$ on these lattice points as follows:

$$\frac{d_{i-1,j-1} + d_{i,j-1}}{2}$$

This value is regarded as the distance between the sequences A and B on the path 27a. By this, it is possible to obtain a value closer to the distance between the sequences A and B on the path 27a than in the case of using $d_{i,j}$ in Example 1. Similarly, the distance between the sequences A and B on the DP path 27b is obtained as follows:

$$\frac{d_{i-1,j} + d_{i-1,j-1}}{2}$$

Since the distances on these paths are both multiplied by ½, the coefficient ½ is unnecessary when obtaining a minimum value of them.

Accordingly, the following expression holds true:

$$g(k) \leftarrow \min \begin{pmatrix} g(k-1) + d_{i,j-1} + d_{i-1,j-1} \\ g(k-1) + d_{i-1,j} + d_{i-1,j-1} \end{pmatrix} \quad (7)$$

$$= \min\{g(k-1) + d_{i,j-1}, g(k+1) + d_{i-1,j}\} + d_{i-1,j-1}$$

Example 3

In the case of obtaining the distances between the sequences A and B on the DP paths by interpolation as described above, it is also possible to shift the DP paths for facilitating the interpolation. In other words, the computation point need not always be the lattice point. For example, as shown in FIG. 6C, the computation points are each shifted one-half the distance between adjacent ones of them in a lateral (i) and a vertical (j) direction, respectively. In this case, the iteration computation becomes as follows:

$$g(k) \quad \min\{g(k-1)+d_{i,j-1}, g(k+1)+d_{i-1,j}\}+d_{i,j} \quad (8)$$
In the case of N=5]

Example 4

In this example, N=5 and use is made of DP paths 27a and 27b obtained by shifting a path between lattice points (i−2, j−3) and (i, j) and a path between lattice points (i−3, j−2) and (i, j) one-half the lattice point spacing in the i and j directions, respectively. The expression of the successive computation becomes as follows:

$$g(k) \leftarrow \min \begin{pmatrix} g(k-1) + 3(d_{i-1,j-2} + d_{i,j}) + d_{i-1,j-1} + d_{i,j-1} \\ g(k+1) + 3(d_{i-2,j-1} + d_{i,j}) + d_{i-1,j-1} + d_{i-1,j} \end{pmatrix} \quad (9)$$

In the case of Example 1, the computational quantity per computation stage is about ¼ that needed in the DP matching shown in FIG. 2 (hereinafter referred to as the conventional method) and the computational quantity throughout the DP matching is approximately 1/12 (=¼×⅓) that in the conventional method. The computational quantity in Examples 2 and 3, as compared with that in the conventional method, is nearly ⅓ per computation stage and about 1/6 as a whole. The computational quantity in Example 4, as compared with that in the conventional method, is about 5/4 per stage and about ¼ (=5/4×1/5) as a whole. This 1/5 is based on a decrease in the number of computation stages.

In order to check the effectiveness of the DP matching of Examples 1 to 3 described above, its processing time and recognition performance were compared with those of the DP matching of the aforementioned quasi-edge free method (hereinafter referred to as the conventional method). The subject of recognition was word speech data of the names of 641 cities spoken twice by four males. As a method for word recognition, use was made of the Split Method set forth in the Proceedings 1-1-17 of the Autumn Meeting by Acoustical Society of Japan, October 1980. With this split method, the computational quantity is almost spent for the DP matching.

A description will be given of the comparison in processing time. In the case where a recognition test of 641×641 words by the conventional method was made through using a minicomputer P. E. 3240, the processing time was about 210 minutes. Under the same condition as in the above experiment, the processing time was about 60 minutes in Example 1 and about 70 minutes in Examples 2 and 3. This indicates that the overall computational quantity by the split method is less than ⅓ that in the case of the conventional method.

Next, the recognition performance of Examples 1 and 2 was evaluated using the speech data of the four persons. With the conventional method, a recognition rate of 96.3% was obtained on the average. Recognition rates of 94.7% and 95.6% were obtained in Examples 1 and 2, respectively. The recognition performance of Example 3 was substantially the same as that of Example 2. It was ascertained that the method of the present invention provided an appreciably high recognition rate, though a little inferior to the conventional method in the recognition performance.

Second Embodiment

Figure 5B:
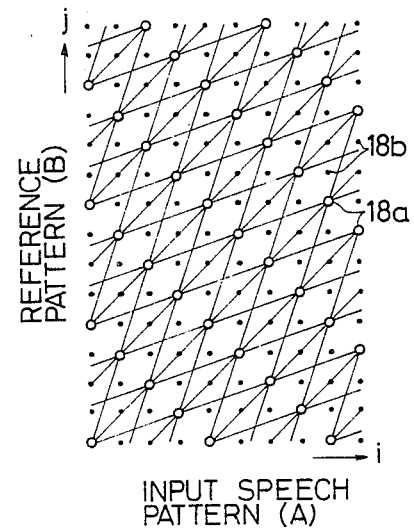
FIG. 5B is a diagram showing lattice points spaced N points apart and DP paths on a distance matrix in a second embodiment of the present invention.

While in the foregoing the DP path is described to be one side of the rhombus joining lattice points spaced N points apart, a diagonal of the rhombus can also be used as the DP path. FIG. 5B shows, by way of example, such DP paths in connection with the case of N=3.

Figure 8A:
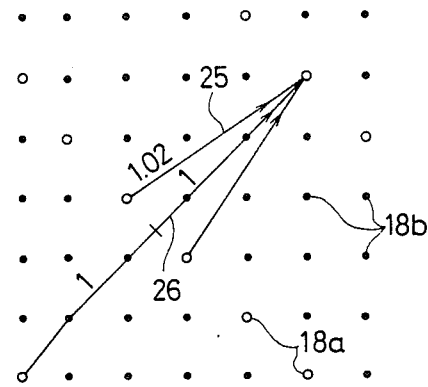
FIGS. 8A and 8B are diagrams explanatory of the length of the DP path in the second embodiment of the present invention.
Figure 8B:
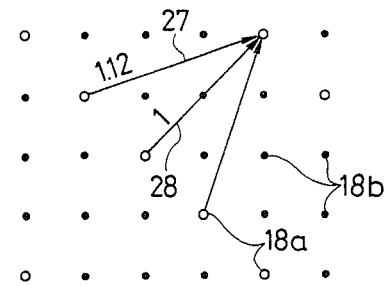

In the conventional DP matching, since the length of the DP path is based on the city block distance, the length of the vertical or lateral path 19 or 20 is the unit length as shown in FIG. 3; consequently, the oblique path 21 is given two weights though it should be given a weight 1.414 (=√2). Accordingly, the oblique path is given an extra weight by 1.414 (=2√2) times. In the second embodiment of the present invention, for example, as shown in FIG. 8A which illustrates the case of N=5, the ratio between the length of a path 25 along one side of the rhombus and the length of a path 26 along the diagonal of the rhombus is 1.02:1.00 and even if their lengths are regarded as equal to each other, no problem arises in practice. In the case of N=4, the ratio between the lengths of two paths 27 and 28 is 1.12:1.00 as shown in FIG. 8B and, also in this case, it does not matter even if these paths are regarded as equal in length. Thus, according to the second embodiment of the present invention, the discrepancy in the length of the path experienced in the prior art method can be alleviated. Generally, also in the case where N is 3 or more, the discrepancy in the length of the path is alleviated as follows:

When $N$ is odd: $\sqrt{1 + \left(\frac{1}{N}\right)^2} : 1.00$

When $N$ is even: $\sqrt{1 + \left(\frac{2}{N}\right)^2} : 1.00$

Specific Examples of Computational Expression

A description will be given of examples of the expression of the successive iteration computation at each computation point in the case of applying the second embodiment of the present invention.

Example 5

Figure 9A:
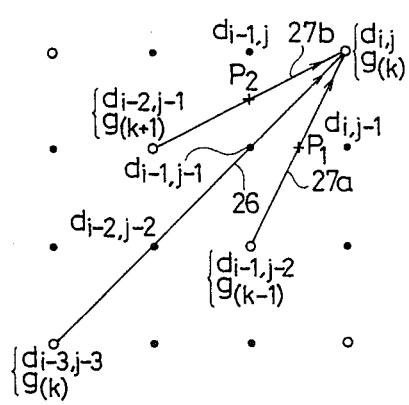
FIGS. 9A to 9E are diagrams showing examples of the DP paths in the second embodiment of the present invention.

FIG. 9A shows DP paths in the case of N=3, which are the path 27a between the lattice points (i−1, j−2) and (i, j), the path 26 between lattice points (i−3, j−3) and (i, j) and the path 27b between the lattice points (i−2, j−1) and (i, j). Corresponding to these paths, the successive computational expression is as follows:

$$g(k) = \min \begin{pmatrix} g(k-1) + d_{i,j-1} \\ g(k) + d_{i-1,j-1} + 2d_{i-2,j-2} \\ g(k+1) + d_{i-1,j} \end{pmatrix} + d_{i-1,j-1} \quad (10)$$

The upper, middle and lower terms on the right side of expression (10) respectively correspond to the paths 27a, 26 and 27b, and the coefficient of the third term of the middle term is a constant for making the lengths of the paths 27a and 27b equal to the length of the path 26. Incidentally, the path 26 is a path in linear matching and called a 1/1 DP path.

Example 6

Figure 9B:
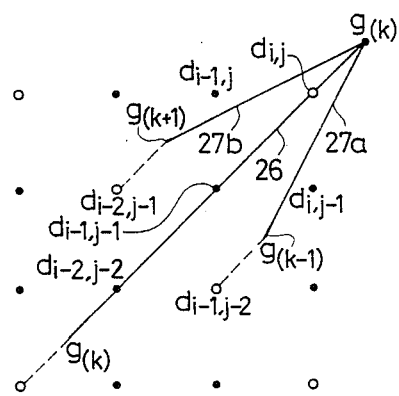

This is the case in which the DP paths 27a, 26 and 27b in Example 5 are respectively shifted in the i and j directions by ½ of the lattice point spacing as shown in FIG. 9B.

$$g(k) \leftarrow \min \begin{pmatrix} g(k-1) + d_{i,j-1} + d_{i,j} \\ g(k) + (d_{i-2,j-2} + d_{i-1,j-1} + d_{i,j}) \times 4/3 \\ g(k+1) + d_{i-1,j} + d_{i,j} \end{pmatrix} \quad (11)$$

4/3 in the middle term on the right side is a weight for making the lengths of the paths equal. In this example, since all matrix elements on the 1/1 DP path are included in the computation, the matching accuracy is increased.

Example 7

Figure 9C:
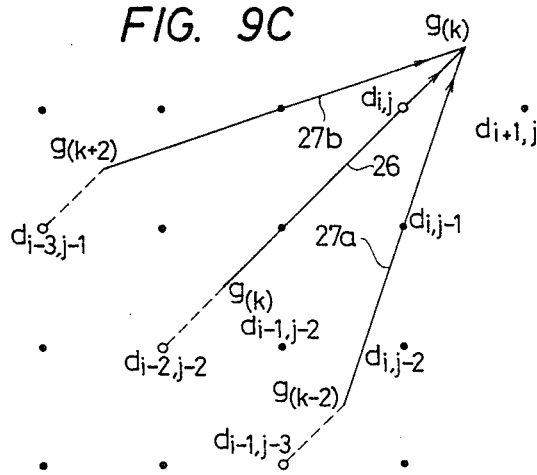

This is the case of N=4 and DP paths are shown in FIG. 9C. A path between lattice points (i−1, j−3) and (i, j), a path between lattice points (i−2, j−2) and (i, j) and a path between lattice points (i−3, j−1) and (i, j) are respectively shifted by ½ of the lattice point spacing in the i and j directions.

$$g(k) \leftarrow \min \begin{pmatrix} g(k-2) + 3d_{i,j-1} + 2(d_{i,j-2} + d_{i,j}) + \\ \quad d_{i-1,j-2} + d_{i+1,j} \\ g(k) + (d_{i,j} + d_{i-1,j-1}) \times 9/2 \\ g(k+2) + 3d_{i-1,j} + 2(d_{i-2,j} + d_{i,j}) + \\ \quad d_{i-2,j-1} + d_{i,j+1} \end{pmatrix} \quad (12)$$

The ratio between the distances to the lattice points (i−1, j−2) and (i, j−2) is 2:1, so that, in order to give a weight corresponding thereto, the path 27a is weighted as $d_{i-1,j-2}$, $2d_{i,j-2}$ in the upper term on the right side. The other paths are similarly weighted.

Example 8

This is the case in which the paths shown in FIG. 9C are used and the computational expression is made simpler than expression (12).

$$g(k) \leftarrow \min \begin{pmatrix} g(k-2) + 2d_{i,j-1} \\ g(k) + d_{i,j} + d_{i-1,j-1} \\ g(k+2) + 2d_{i-1,j} \end{pmatrix} \quad (13)$$

Example 9

Figure 9D:
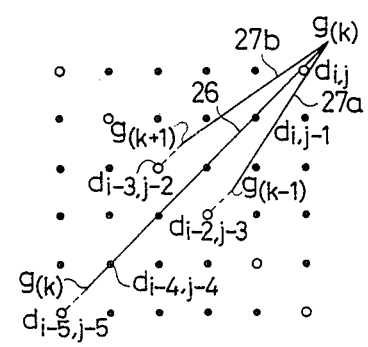

This is the case in which N=5 and paths for DP matching are shown in FIG. 9D.

$$g(k) \leftarrow \min \begin{pmatrix} g(k-1) + 3(d_{i-1,j-2} + d_{i,j}) + d_{i-1,j-1} + \\ \quad d_{i,j-1} \\ g(k) + (d_{i,j} + d_{i-1,j-1} + d_{i-2,j-2} + \\ \quad d_{i-3,j-3} + d_{i-4,j-4}) \times 16/5 \\ g(k+1) + 3(d_{i-2,j-1} + d_{i,j}) + d_{i-1,j-1} + \\ \quad d_{i-1,j} \end{pmatrix} \quad (14)$$

Example 10

Figure 9E:
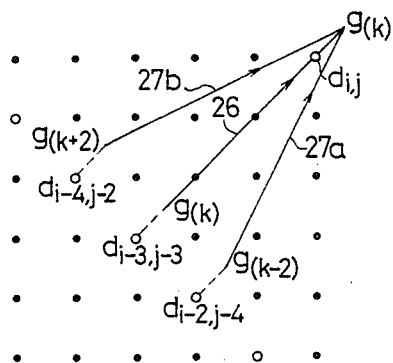

This is the case in which N=6 and DP paths are shown in FIG. 9E.

$$g(k) \leftarrow \min \begin{pmatrix} g(k-2) + d_{i,j} + d_{i,j-1} + d_{i-1,j-2} + d_{i-1,j-3} \\ g(k) + (d_{i,j} + d_{i-1,j-1} + d_{i-2,j-2}) \times 4/3 \\ g(k+2) + d_{i,j} + d_{i-1,j} + d_{i-2,j-1} + d_{i-3,j-1} \end{pmatrix} \quad (15)$$

Thus, the calculated value g(i, j) of the recurrence formula of the successive iteration computation is determined by g(k−1), g(k) and g(k+1) (in the case of N being an even number, g(k), g(k+2) and g(k−2)) and the value of the distance matrix D of the points in the vicinity of the point (i, j). Next, a simple comparison will be made between the computational quantities necessary for the DP matching in the cases of using the computational expressions shown in Examples 5 to 10 and the computational quantity necessary for the DP matching of the conventional system.

(Example 5) ... The computational quantity per stage is substantially equal to that in the conventional DP matching system but since the number of successive iteration computations is ⅓ that in the conventional system, the overall computational quantity is about ⅓ that needed in the conventional system.

(Example 6) ... The computational quantity per stage is about 9/8 that in the conventional system and the overall computational quantity is approximately $\frac{1}{3}$ ($=9/8\times\frac{1}{3}$) that in the conventional system.

(Example 7) ... The computational quantity per stage is about 2.5 times larger than that in the conventional system but the overall computational quantity is nearly $2.5\times\frac{1}{4}$ that in the conventional system.

(Example 8) ... The computational quantity per stage is about $\frac{2}{3}$ that in the conventional system and the overall computational quantity is about 1/6 ($=\frac{2}{3}\times\frac{1}{4}$) that in the conventional system.

(Example 9) ... The computational quantity per stage is nearly twice as large as that needed in the conventional system but the overall computational quantity is about 2/5 that required in the conventional system.

(Example 10) ... The computational quantity per stage is about 13/8 times larger than that in the conventional system but the overall computational quantity is about $\frac{1}{4}$ ($=13/8\times1/6$) that needed in the conventional system.

For clarifying the effectiveness of the present invention, Examples 6 and 9 were compared with the DP matching method of the aforementioned quasi-edge free (hereinafter referred to as the DP matching of the conventional method) in terms of the processing time and the recognition performance. The subject of recognition was word speech data of the names of 641 cities spoken twice by four males. The aforementioned split method was used. First, the comparison was made in connection with the processing time. In the case of a recognition test of $641\times641$ words by the DP matching of the conventional method through using a minicomputer Perkin-Elmer 3240 under the control of a FORTRAN program, the processing time was 210 minutes. By the DP matching of Examples 6 and 9, the recognition tests were finished in about 110 minutes. This indicates that the computing time by the split method is about $\frac{1}{2}$ that by the DP matching of the conventional method, proving that the computational quantity by the DP matching of the second embodiment is small. Next, the recognition performance was evaluated using the speech data of the four persons. With the DP matching of the conventional method, the recognition rate was 96.3% on the average. In the case of using the DP matching of Example 6, the recognition rate was 96.2% on the average and, in the case of using the DP matching of Example 9, the recognition rate was 95.6% on the average. It could be proved that the recognition performance of Examples 6 and 9 was substantially equal to that of the DP matching of the conventional method.

Quasi-Edge Free

Figure 10:
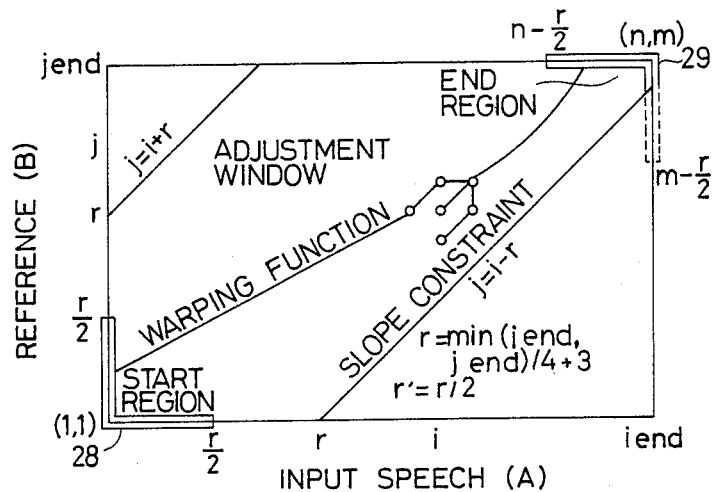
FIG. 10 is a diagram showing edge regions on the distance matrix in quasi-edge free DP matching.

As described previously in respect of FIG. 2, it is general practice in the art to execute the DP matching on the distance matrix which can be calculated from elements following the elements $a_1$ and $b_1$ at the start point (i=1, j=1) of the speech extraction. Because of this, the prior art suffers the recognition error caused by the ambiguity of the start of the speech extraction. To improve this, the present inventor has proposed the aforementioned quasi-edge free method. According to this method, initialization of the DP matching on a distance matrix between a sequence $A=a_1, a_2, \ldots a_n$ and a sequence $B=b_1, b_2, \ldots b_m$ as shown in FIG. 10 is carried out as follows:

$$g(0)=2\times d_{1,1}$$

$$g(j-1)=g(j-2)+d_{1,j} \text{ for } 2\leq j<r/2 \text{ and } i=1$$

$$g(1-i)=g(2-i)+d_{i,1} \text{ for } 2\leq i<r/2 \text{ and } j=1$$

$$g(j-1)=\infty \text{ for } r/2<j\leq r \text{ and } i=1$$

$$g(1-i)=\infty \text{ for } r/2<i\leq r \text{ and } j=1$$

where r indicates the width of the window. i=1 to r/2 on the i-axis and j=1 to r/2 on the j-axis constitute a start region 28. Incidentally, in the conventional DP matching shown in FIG. 2, $g(j-1)=\infty$ for $2\leq j\leq r$ and i=1 and $g(1-i)=\infty$ for $2\leq i<r$ and j=1.

For this initialization, the successive iteration of expression (1) is performed from the lattice point (i, j) of a small value to the end point (i=n, j=m). The end point is also designed so that a region 34 of (n−r/2 to n, m) and (n, m−r/2 to m) may be the end point. Thus, the quasi-edge free method permits special paths only in the vertical and lateral directions in the vicinity of the start point. This method is superior to the system shown in FIG. 2 but abnormal correspondence may sometimes occur to adversely affect the recognition performance.

Third Embodiment

Figure 11:
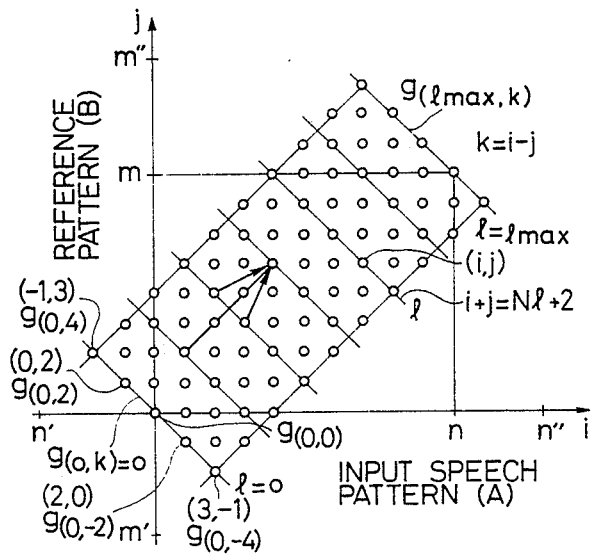
FIG. 11 is a diagram showing a distance matrix explanatory of the edge free in the present invention.

A description will be given of the method of the present invention (hereinafter referred to as the edge free method) which overcomes the problem of the aforementioned ambiguity of the start of speech extraction. As the inputs are used sequences of ambiguous start of extraction, $A=a_{n'}\ldots a_0 a_1 \ldots a_n \ldots a_{n''}$ and $B=b_{m'}\ldots b_0 b_1 \ldots b_m \ldots b_{m''}$. In the prior art DP matching, the successive iteration computation is repeated from the start point $a_1$, $b_1$ (the lattice point (1,1)) to the end point $a_n$, $b_m$ (the lattice point (n,m)) and the time axis is nonlinearly expanded and compressed so that the score may become minimum. This is as shown in FIG. 2. In the DP matching of the present invention, at the start point, the value $d_{i,j}$ of the distance from an element preceding the element $a_1$ or $b_1$ is also employed. To perform this, the lattice points in the (l=0)-th stage of the DP matching are expanded to a region of elements preceding the element $a_1$ or $b_1$ as shown in FIG. 11. Accordingly, the start point, which is only the lattice point (1,1) in the conventional DP matching, is expanded to an assembly of lattice points (i,j) within the adjustment window which satisfy i+j=2. The initial value of the successive iteration computation in the assembly (−1,3), (0,2), (1,1), (2,0), (3,−1) of the lattice points $(i,j)\epsilon i+j=2$ at the start point is set to g(k)=0 (where k=j−i). Similarly, the end point is expanded to an assembly (i,j) of the $l_{max}$ stage within the adjustment window which satisfy $i+j=l_{max}N+2$.

Specific Embodiment

Figure 12:
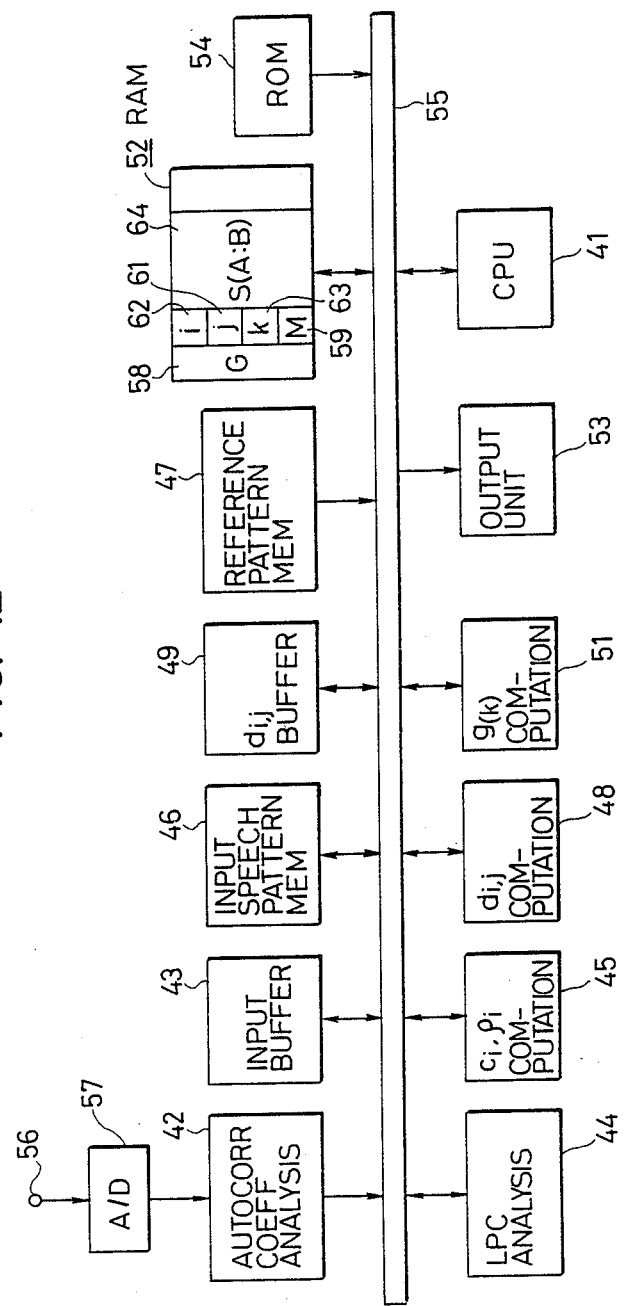
FIG. 12 is a block diagram illustrating an embodiment of the DP matching apparatus of the present invention as being applied to a speech recognition apparatus.

A description will be given, with reference to FIGS. 12 and 13, of a specific example of a word speech recognition apparatus embodying the DP matching of the present invention described in the foregoing. Connected to a bus 55 are a central processing unit (hereinafter referred to as the CPU) 41 for controlling the entire system, an autocorrelation coefficients analysis unit 42, an input buffer 43, an LPC analysis unit 44, a feature parameter computing unit 45, an input speech pattern memory 46 for storing a time sequence of feature parameters of an input speech, a reference pattern memory 47 which has stored therein time sequences of feature parameters of reference patterns of all words to be recognized, a distance matrix computing unit 48 for computing a distance matrix between two time sequences, a distance matrix buffer 49 for storing elements of the computed distance matrix, a cost function computing unit 51 for computing a cost function value in the successive iteration computation of the DP matching, a random access memory (hereinafter referred to as the RAM) 52 for storing data and parameters necessary for various computations, intermediate results of computations, indexes for computations and so forth, an output section 53 for outputting the results of recognition, and a read only memory (hereinafter referred to as the ROM) 54 which has stored therein a program indicating control means for the entire system. The CPU 41 sequentially reads out the program from the ROM 54 and decodes and executes it, performing the recognition processing as described hereinbelow.

Figure 13:
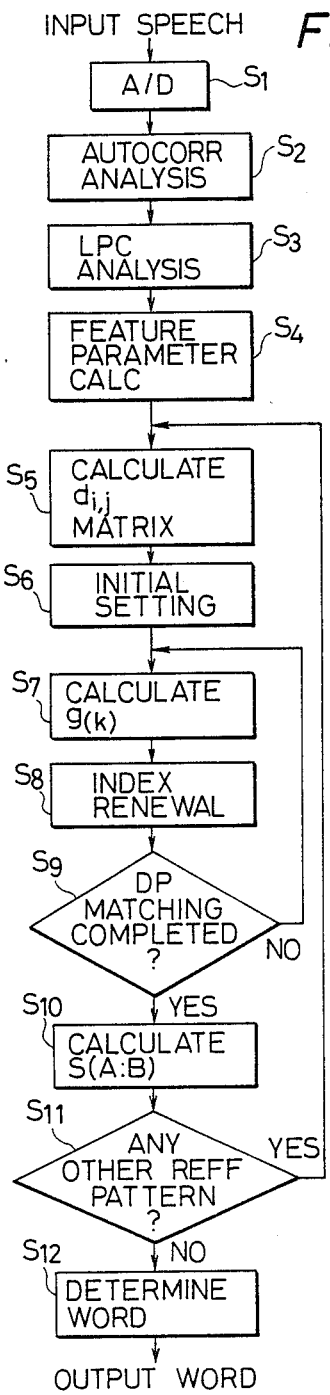
FIG. 13 is a flowchart showing the operation in FIG. 12.

In step $S_1$ in the flowchart of FIG. 13, a speech input entered from an input terminal 56 is provided to an AD converter 57, wherein it is sampled, for example, every 8 KHz and each sampled value is converted into a 12-bit digital signal, which is applied to the autocorrelation coefficient computing unit 42. In step $S_2$ the autocorrelation coefficient computing unit 42 emphasizes a high-frequency component of the input speech signal as required and then calculates autocorrelation coefficients up to the 10th degree, for instance, with a 16 millisecond frame period and using a 32 millisecond Hamming window. The calculated results are stored in the input buffer 43. In step $S_3$ the autocorrelation coefficients from the input buffer 43 are provided to the LPC analysis unit 44, wherein an LPC (Linear Predictive Coding) analysis up to the 10th degree is carried out for each frame. The LPC coefficient thus obtained is applied to the feature parameter computing unit 45, wherein LPC Cepstrum coefficients $C_i$ up to the 16th degree and autocorrelation coefficients $\rho_i$ up to the 16th degree of an LPC spectrum envelope are computed, and the compound results are stored in the input pattern memory 46 (Step $S_4$). In the input parameter memory 46 a time sequence A of feature parameters of a word input speech is stored with the Cepstrum coefficient $C_i$ and the autocorrelation coefficient $\rho_i$ as an element $a_i$. Similarly, a time sequence B of feature parameters of a reference pattern is stored in the reference pattern memory 47, with the Cepstrum coefficient $C_i^*$ and the autocorrelation coefficient $\rho_i^*$ as an element $b_i$.

In the next step $S_5$, the time sequence A of the input speech from the input pattern memory 46 and the time sequence B of the reference pattern from the reference pattern memory 47 are input to the distance matrix computing unit 48, wherein the distance $d_{i,j}$ between respective elements of both time sequences A and B is calculated in terms of the WLR measure given by the following expression:

$$\sum_{i=1}^{16} (C_i - C_i^*)(\rho_i - \rho_i^*)$$

In this way, the distance matrix is obtained and this distance matrix is obtained for all reference patterns of word to be recognized.

Next, the operation is shifted to the DP matching process and, in step $S_6$, initialization is performed. That is, contents $g(-r)$ to $g(r)$ of cost function buffers $G(-r)$ to $G(r)$ where r is the width of the adjustment window) provided in a region 58 of the RAM 52 are set to 0 and the other values are selected large. A constant $M=5$, a maximum value of a number i, a minimum value of the number i and $k=j-i$ are set in regions 59, 61, 62 and 63 of the RAM 52, respectively.

In step $S_7$, data $d_{i,j}$, $d_{i,j-1}$, $d_{i-1,j-1}$, $d_{i-2,j-2}$, $g(k-1)$, $g(k)$ and $g(k+1)$ necessary for the DP computation according to i, j and k in the regions 61 to 63 are transferred from the distance matrix buffer 49 and the cost function buffer 58 to the cost function value computing unit 51, wherein the following calculation is performed:

$$g(k) \leftarrow \min \begin{cases} g(k-1) + d_{i,j-1} + d_{i,j} \\ g(k) + (d_{i-2,j-2} + d_{i-1,j-1} + d_{i,j}) \times 4/3 \\ g(k+1) + d_{i-1,j} + d_{i,j} \end{cases}$$

The result of this calculation, that is, the cost function value $g(k)$ is loaded in the corresponding buffer $G(k)$ of the region 58. In step $S_8$, j is decremented by one, i is incremented by one and k is decremented by two. As a result of this, if the computation point (i, j) gets out of the adjustment window, $$j = \frac{M+r}{2} + 1,$$

$i=M-j$ and $k=j-i$ are calculated with $M+3$ supposed to be M. At any rate, these M, j, i and k are stored in the regions 59, 61, 62 and 63 each time they are updated. Furthermore, upon each occurrence of their updating, it is checked in step $S_9$ whether the new value of M is larger than the sum of an integer $$\left[\frac{n+m}{3}\right]$$

and 3. If not, the operation goes back to step $S_7$, in which required data are taken out from the distance matrix buffer 49 and the RAM 52 and the cost function value $g(k)$ is computed in the cost function value computing unit 51 and the same operation as described above is carried out again.

In the case where the value of M is larger than the abovesaid value, the DP matching of the two time sequences A and B is finished and, in step $S_{10}$, the inter-word distance $S(A:B)$ at that time is computed by the following expression:

$$S(A:B) = \left( \min_{(i,j)\in i + j = M - 3} g(k) \right) / (3 \times (M - 3))$$

This word distance is stored in a region 64 of the RAM 52. Next, it is checked in step $S_{11}$ whether the time sequence B of the reference pattern whose distance to the time sequence A of the input speech is to be calculated still remains in the reference pattern memory 47. If so, the operation returns to step $S_5$, and if not, the operation proceeds to step $S_{12}$, in which the region 64 of the RAM 52 is read out and the word name of the shortest one of the word distances obtained so far is output in the form of a display or printed letter from the output unit 53 or provided to another device.

In the foregoing, the initialization in step $S_6$, the index updating in step $S_8$, the computation of the word distance in step $S_{10}$, the decision in step $S_{11}$ and the determination of the word in step $S_{12}$ are all performed under the control of the CPU 41.

Concrete Effects

The DP matching employing the aforementioned edge free method was evaluated by a word speech recognition test using word speech data of 641 city names spoken twice by four males. The test was conducted in a computer room of a noise level 68 to 70 dB(A) and the speech data were input through the use of a dynamic microphone. The speech data obtained first and the speech data obtained two weeks later will be referred to as the set A and the set B, respectively. The speech was applied to a 4 KHz low-pass filter and sampled at 8 KHz and then an autocorrelation analysis of the 12th degree was carried out using a 32 ms Hamming window of 16 ms steps. In a correlation coefficient region the high-frequency region was emphasized by a one-zero filter $(1-Z^{-1})$, after which the low-frequency region was weighted by a one-zero filter $(1+0.3.Z^{-1})$ for the WLR measure. Thereafter, an LPC analysis of the 10th degree was performed. The word speech period was automatically extracted using power information.

As the recognition method, the SPLIT method employing the WLR measure was used. For each speaker, 128 quasi-phoneme reference patterns were produced from the speech data of the first more than 90 words of the set A so that a spectrum distortion by the WLR measure might be diminished. Then, word reference patterns (sequences of quasi-phonemes) using the speech data of the set A were produced. For executing the DP matching of the edge free method, speech frames preceding the start point and following the end point are required. The data for the evaluation is already extracted and rendered into a data base. Accordingly, the frames preceding the start point and following the end point were extrapolated by marginal frames in this recognition test.

The edge free DP matching of the present invention was evaluated using the speech data of the set B. Compared with this were the aforementioned quasi-edge free DP matching (DP-OLD) and the DP matching of first and second embodiments of the present invention employing the quasi-edge free method. Table 1 shows average word recognition rates of the four speakers. Also shown in Table 1 are processing times obtained in 641×641 word recognition tests of the quasi-edge free DP matching of the first and second embodiments. Considering that, of the 641×641 word recognition time, about 25 minutes are required for the LPC analysis and the computation of the WLR measure and about 20 minutes for the processing of the DP matching other than the successive computation, the 641×641 word recognition time in Table 1 and the overall computational quantities described previously in respect of the first and second embodiments show excellent correspondence as depicted in FIG. 14.

TABLE 1

|  | Processing time (minute) | Quasi-edge free Recognition rate (%) | Edge free Recognition rate (%) |
| --- | --- | --- | --- |
| DP-OLD | 210 | 96.3 | — |
| Example 1 | 60 | 94.7 | 94.8 |
| Example 2 | 70 | 95.6 | 95.8 |
| Example 3 | 70 | 94.7 | 95.5 |
| Example 5 | 85 | 95.9 | 96.5 |
| Example 6 | 110 | 96.2 | 96.7 |
| Example 9 | 110 | 96.0 | 96.6 |
| Example 7 | 140 | — | 95.7 |
| Example 10 | 100 | — | 95.9 |

Figure 14:
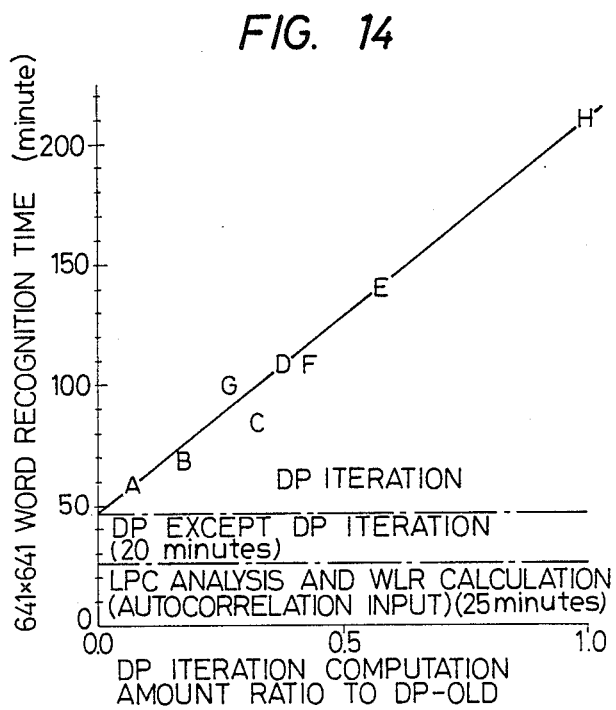
FIG. 14 is a diagram showing the relationship between the recognition processing time and the computational quantity, explanatory of the effect of the present invention.

In FIG. 14, A, B, C, D, E, F, G and H respectively indicate Examples 1, 2, 3, 5, 6, 7, 9 and 10 and DP-OLD. In Table 1, the processing times of Examples 7 and 10 are recognition times in the case of the edge free. The word recognition rate by the edge free DP matching of the present invention increases 0.1 to 0.8% over the word recognition rate by the corresponding quasi-edge free DP matching of the present invention; it is seen that the edge free processing is effective. In the edge free processing in the abovesaid test, the frames preceding the start point and following the end point were substituted with marginal frames, but it is considered that the recognition rate would be further raised by using frames of actual speech data.

While in the foregoing the description has been given of the method of DP matching based on the distance between feature parameters, the present invention is also applicable to the case of performing the DP matching using the similarity between the feature parameters and, in such a case, it is sufficient only to set max (maximum) for min (minimum) in each of the aforementioned expressions. An increase in the value of N decreases the recognition rate and, in the case of the same word speech, the difference in speed between the time sequences A and B is not so large; therefore, letting the DP path of the linear matching be represented by a 1/1 path as mentioned previously, the DP path usable in the present invention is preferred to a path $$\frac{N-1}{N+1}$$

when N is an odd number and a path $$\frac{N-2}{N+2}$$

when N is an even number. Furthermore, the present invention can be applied not only to the DP matching between time sequences of speech but also to DP matching between feature sequences of hand-written letters, for instance, as described previously.

It will be apparent that many modifications and variations may be effected without departing from the scope of the novel concepts of the present invention.

What is claimed is:

1. A speech recognition apparatus comprising an input terminal for receiving an analog speech signal, and a sequence pattern matching circuit responsive to said analog speech signal for producing a sensible manifestation of a word in said speech signal, said pattern matching circuit including:
an A/D converter coupled to said terminal for converting said analog speech signal into a digital signal at a predetermined sampling frequency;
feature parameter calculating means responsive to said digital signal for calculating a sequence of feature parameters $A = a_1 a_2 \ldots a_n$ of said speech signal;

an input signal pattern memory for storing the calculated sequence of the feature parameters received from said feature parameter calculating means;

a reference pattern memory for storing sequences of reference feature parameters $B = b_1 b_2 \ldots b_m$ of reference patterns to be compared with the calculated feature parameters;

comparison means comprising a distance matrix computing unit for computing a distance matrix $\{d_{ij}\}$ between the calculated feature parameters and the reference feature parameters of one of the reference patterns for $i + r \geq j \geq i - r$ where r is a window width;

a distance matrix buffer for storing elements $d_{i,j}$ on lattice points (i,j) of the calculated distance matrix;

a cost function computing unit for computing values of cost function $g(i,j)$ on the basis of the elements $d_{i,j}$ for the lattice points satisfying the equation $i + j = M + lN$ where M is a constant and $N \geq 3$;

a cost function buffer memory for storing the computed values of cost function, said cost function buffer memory comprising memory regions for storing the values $G(r), \ldots, G(0), \ldots, G(-r)$ of the cost function;

control means for effecting a successive iteration computation of the cost function for $l = 0, 1, 2 \ldots$, the paths to reach each lattice point on $i + j = M + lN$ where a corresponding cost function is to be calculated by said cost function computing unit being selected by said control means to be one of at least two oblique paths having the same distance from the lattice points on $i + j = M + (l-1)N$; and means responsive to completion of the comparison of the calculated feature parameters with said reference feature parameters for producing a sensible manifestation of a word in said analog speech signal.

2. An apparatus according to claim 1 wherein a DP path in the successive iteration computation is selected from two paths whose lengths to the computation point are equal in terms of the Euclidean distance.

3. An apparatus according to claim 2 wherein a path of linear matching is added as the dynamic programming path.

4. An apparatus according to claim 2 wherein a cost function value g(k) obtained by the successive iteration computation of the dynamic programming at each computation point is obtained by calculating the following expression:

$$g(k) \quad \min \{g(k-1), g(k+1)\} + d_{i,j}$$

where $N = 3$ and $k = j - i$.

5. An apparatus according to claim 2 wherein a cost function value g(k) obtained by the successive iteration computation of the dynamic programming at each computation point is obtained by calculating the following expression:

$$g(k) \quad \max \{g(k-1), g(k+1)\} + d_{i,j}$$

where $N = 3$ and $k = j - i$.

6. An apparatus according to claim 2 wherein a cost function value g(k) obtained by the successive iteration computation of the dynamic programming at each computation point is obtained by calculating the following expression:

$$g(k) \quad \min \{g(k-1) + d_{i,j-1}, g(k+1) + d_{i-1,j}\} + d_{i-1,j-1}$$

where $N = 3$ and $k = j - i$.

7. An apparatus according to claim 2 wherein a cost function value g(k) obtained by the successive iteration computation of the dynamic programming at each computation point is obtained by calculating the following expression:

$$g(k) \quad \min \{g(k-1) + d_{i,j-1}, g(k+1) + d_{i-1,j}\} d_{i-1,j-1}$$

where $N = 3$ and $k = j - i$.

8. An apparatus according to claim 2 wherein a cost function value g(k) obtained by the successive iteration computation of the dynamic programming at each computation point is obtained by calculating the following expression:

$$g(k) \quad \min \{g(k-1) + d_{i,j-1}, g(k+1) + d_{i-1,j}\} + d_{i,j}$$

where $N = 3$ and $k = j - i$.

9. An apparatus according to claim 2 wherein a cost function value g(k) obtained by the successive iteration computation of the dynamic programming at each computation point is obtained by calculating the following expression:

$$g(k) \quad \max \{g(k-1) + d_{i,j-1}, g(k+1) + d_{i-1,j}\} d_{i,j}$$

where $N = 3$ and $k = j - i$.

10. An apparatus according to claim 2 wherein a cost function value g(k) obtained by the successive iteration computation of the dynamic programming at each computation point is obtained by calculating the following expression:

$$g(k) \leftarrow \min \begin{pmatrix} g(k-1) + 3(d_{i-1,j-2} + d_{i,j}) + d_{i-1,j-1} + d_{i,j-1} \\ g(k+1) + 3(d_{i-2,j-1} + d_{i,j}) + d_{i-1,j-1} + d_{i-1,j} \end{pmatrix}$$

where $N = 5$ and $k = j - i$.

11. An apparatus according to claim 2 wherein a cost function value g(k) obtained by the successive iteration computation of the dynamic programming at each computation point is obtained by calculating the following expression:

$$g(k) \leftarrow \max \begin{pmatrix} g(k-1) + 3(d_{i-1,j-2} + d_{i,j}) + d_{i-1,j-1} + d_{i,j-1} \\ g(k+1) + 3(d_{i-2,j-1} + d_{i,j}) + d_{i-1,j-1} + d_{i-1,j} \end{pmatrix}$$

where $N = 5$ and $k = j - i$.

12. An apparatus according to claim 2 wherein a cost function value g(k) obtained by the successive iteration computation of the dynamic programming at each computation point is obtained by calculating the following expression:

$$g(k) \leftarrow \min \begin{Bmatrix} g(k-1) + d_{i,j-1} \\ g(k) + d_{i-1,j-1} + 2d_{i-2,j-2} \\ g(k+1) + d_{i-1,j} \end{Bmatrix} + d_{i-1,j-1}$$

where $N = 3$ and $k + j - i$.

13. An apparatus according to claim 3 wherein a cost function value g(k) obtained by the successive iteration computation of the dynamic programming at each computation point is obtained by calculating the following expression:

$$g(k) \leftarrow \max \begin{pmatrix} g(k-1) + d_{i,j-1} \\ g(k) + d_{i-1,j-1} + 2d_{i-2,j-2} \\ g(k+1) + d_{i-1,j} \end{pmatrix} + d_{i-1,j-1}$$

where $N=3$ and $k=j-i$.

14. An apparatus according to claim 3 wherein a cost function value g(k) obtained by the successive iteration computation of the dynamic programming at each computation point is obtained by calculating the following expression:

$$g(k) \leftarrow \min \begin{cases} g(k-1) + d_{i,j-1} + d_{i,j} \\ g(k) + (d_{i-2,j-2} + d_{i-1,j-1} + d_{i,j}) \times 4/3 \\ g(k+1) + d_{i-1,j} + d_{i,j} \end{cases}$$

where $N=3$ and $k=j-i$.

15. An apparatus according to claim 3 wherein a cost function value g(k) obtained by the successive iteration computation of the dynamic programming at each computation point is obtained by calculating the following expression:

$$g(k) \leftarrow \max \begin{cases} g(k-1) + d_{i,j-1} + d_{i,j} \\ g(k) + (d_{i-2,j-2} + d_{i-1,j-1} + d_{i,j}) \times 4/3 \\ g(k+1) + d_{i-1,j} + d_{i,j} \end{cases}$$

where $N=3$ and $k=j-i$.

16. An apparatus according to claim 3 wherein a cost function value g(k) obtained by the successive iteration computation of the dynamic programming at each computation point is obtained by calculating the following expression:

$$g(k) \leftarrow \min \begin{cases} g(k-2) + 3d_{i,j-1} + 2(d_{i,j-2} + d_{i,j}) + \\ \quad d_{i-1,j-2} + d_{i+1,j} \\ g(k) + (d_{i,j} + d_{i-1,j-1}) \times 9/2 \\ g(k+2) + 3d_{i-1,j} + 2(d_{i-2,j} + d_{i,j}) + \\ \quad d_{i-2,j-1} + d_{i,j+1} \end{cases}$$

where $N=3$ and $k=j-i$.

17. An apparatus according to claim 3 wherein a cost function value g(k) obtained by the successive iteration computation of the dynamic programming at each computation point is obtained by calculating the following expression:

$$g(k) \leftarrow \max \begin{cases} g(k-2) + 3d_{i,j+1} + 2(d_{i,j-2} + d_{i,j}) + \\ \quad d_{i-1,j-2} + d_{i+1,j} \\ g(k) + (d_{i,j} + d_{i-1,j-1}) \times 9/2 \\ g(k+2) + 3d_{i-1} + 2(d_{i-2,j} + d_{i,j}) + \\ \quad d_{i-2,j-1} + d_{i,j+1} \end{cases}$$

where $N=3$ and $k=j-i$.

18. An apparatus according to claim 3 wherein a cost function value g(k) obtained by the successive iteration computation of the dynamic programming at each computation point is obtained by calculating the following expression:

$$g(k) \leftarrow \min \begin{cases} g(k-2) + 2d_{i,j-1} \\ g(k) + d_{i,j} + d_{i-1,j-1} \\ g(k+2) + 2d_{i-1,j} \end{cases}$$

where $N=4$ and $k=j-i$.

19. An apparatus according to claim 3 wherein a cost function value g(k) obtained by the successive iteration computation of the dynamic programming at each computation point is obtained by calculating the following expression:

$$g(k) \leftarrow \max \begin{cases} g(k-2) + 2d_{i,j-1} \\ g(k) + d_{i,j} + d_{i-1,j-1} \\ g(k+2) + 2d_{i-1,j} \end{cases}$$

where $N=4$ and $k=j-i$.

20. An apparatus according to claim 3 wherein a cost function value g(k) obtained by the successive iteration computation of the dynamic programming at each computation point is obtained by calculating the following expression:

$$g(k) \leftarrow \min \begin{cases} g(k-1) + 3(d_{i-1,j-2} + d_{i,j}) + \\ \quad d_{i-1,j-1} + d_{i,j-1} \\ g(k) + \quad (d_{i,j} + d_{i-1,j-1} + d_{i-2,j-2} + \\ \quad d_{i-3,j-3} + d_{i-4,j-4}) \times 16/5 \\ g(k+1) + 3(d_{i-2,j-1} + d_{i,j}) + \\ \quad d_{i-1,j-1} + d_{i-1,j} \end{cases}$$

where $N=5$ and $k=j-i$.

21. An apparatus according to claim 3 wherein a cost function value g(k) obtained by the successive iteration computation of the dynamic programming at each computation point is obtained by calculating the following expression:

$$g(k) \leftarrow \max \begin{cases} g(k-1) + 3(d_{i-1,j-2} + d_{i,j}) + \\ \quad d_{i-1,j-1} + d_{i,j-1} \\ g(k) + \quad (d_{i,j} + d_{i-1,j-1} + d_{i-2,j-2} + \\ \quad d_{i-3,j-3} + d_{i-4,j-4}) \times 16/5 \\ g(k+1) + 3(d_{i-2,j-1} + d_{i,j}) + \\ \quad d_{i-1,j-1} + d_{i-1,j} \end{cases}$$

where $N=5$ and $k=j-i$.

22. An apparatus according to claim 3 wherein a cost function value g(k) obtained by the successive iteration computation of the dynamic programming at each computation point is obtained by calculating the following expression:

$$g(k) \leftarrow \min \begin{cases} g(k-2) + d_{i,j} + d_{i,j-1} + d_{i-1,j-2} + d_{i-1,j-3} \\ g(k) + (d_{i,j} + d_{i-1,j-1} + d_{i-2,j-2}) \times 4/3 \\ g(k+2) + d_{i,j} + d_{i-1,j} + d_{i-2,j-1} + d_{i-3,j-1} \end{cases}$$

where $N=6$ and $k=j-i$.

23. An apparatus according to claim 3 wherein a cost function value g(k) obtained by the successive iteration computation of the dynamic programming at each computation point is obtained by calculating the following expression:

$$g(k) \leftarrow \max \begin{cases} g(k-2) + d_{i,j} + d_{i,j-1} + d_{i-1,j-2} + d_{i-1,j-3} \\ g(k) + (d_{i,j} + d_{i-1,j-1} + d_{i-2,j-2}) \times 4/3 \\ g(k+2) + d_{i,j} + d_{i-1,j} + d_{i-2,j-1} + d_{i-3,j-1} \end{cases}$$

where $N=6$ and $k=j-i$.

24. An apparatus according to any one of claims 1 to 23 wherein the two sequences of feature parameters are $A=a_n, \ldots a_0, a_1, \ldots a_n$ and $B=b_m, \ldots b_0, b_1, \ldots b_m$, where $a_1$ and $b_1$ are regarded as forming start points of the sequences A and B and render the cost function value g(k) (where $k=j-i$) corresponding to the point satisfying $i+j=M$ into zero.

25. An matching apparatus according to claim 24 wherein the two sequences of feature parameters are $A=a_n, \ldots a_0, a_1, \ldots a_n, \ldots a_{n''}$ and $B=b_{m'}, \ldots b_0, b_1, \ldots b_m, \ldots b_{m''}$, where $a_n$ and $b_m$ are regarded as forming end points of the sequences A and B.

26. A method of effecting speech recognition by use of a sequence pattern matching procedure to determine the similarity between two sequences of feature parameters $A=a_1 \ldots a_n$ of an input speech signal and feature parameters $B=b_1 \ldots b_m$ of a reference pattern, comprising the steps of sampling an input speech signal at a predetermined frequency to produce a sequence of sample data, computing a feature parameter for each predetermined number of sample data forming one frame period, detecting the start of the speech signal, storing into an input speech pattern memory feature parameters of successive frames, said storing step successively storing all the computed feature parameters regardless of whether they precede or follow the detected start of the speech signal, reading out of the input speech pattern memory, upon detection of the start of the speech signal, feature parameters n' frames before the detected start of the speech signal and succeeding feature parameters to obtain a sequence of feature parameters $A=a_{-n'}a_{-n'+1} \ldots a_0 a_1 \ldots a_n$ where n' is an integer satisfying $n' \geq (r-1)/2$ and r is a window width, computing distance matrix elements $d_{i,j}$ at lattice points (i,j) defined between the two sequences of the feature parameters A and B satisfying $i+r \geq j \geq i-r$, executing a successive iteration computation of dynamic programming by computing a cost function g(i,j) for all the lattice points satisfying $i+j=2+l$, $i \geq 1$, $j \geq 1$ and $l=0, 1, 2, \ldots$ starting with all the lattice points satisfying $i+j=2$, $i \geq -n'$, $J \geq -n'$ and $i+r \geq j \geq i-r$ to determine a minimum score value for each sequence of the reference feature parameters, and producing a sensible manifestation of a word in said input speech signal upon completion of said sequence pattern matching procedure.

* * * * *